United States Patent Office 3,426,202
Patented Feb. 4, 1969

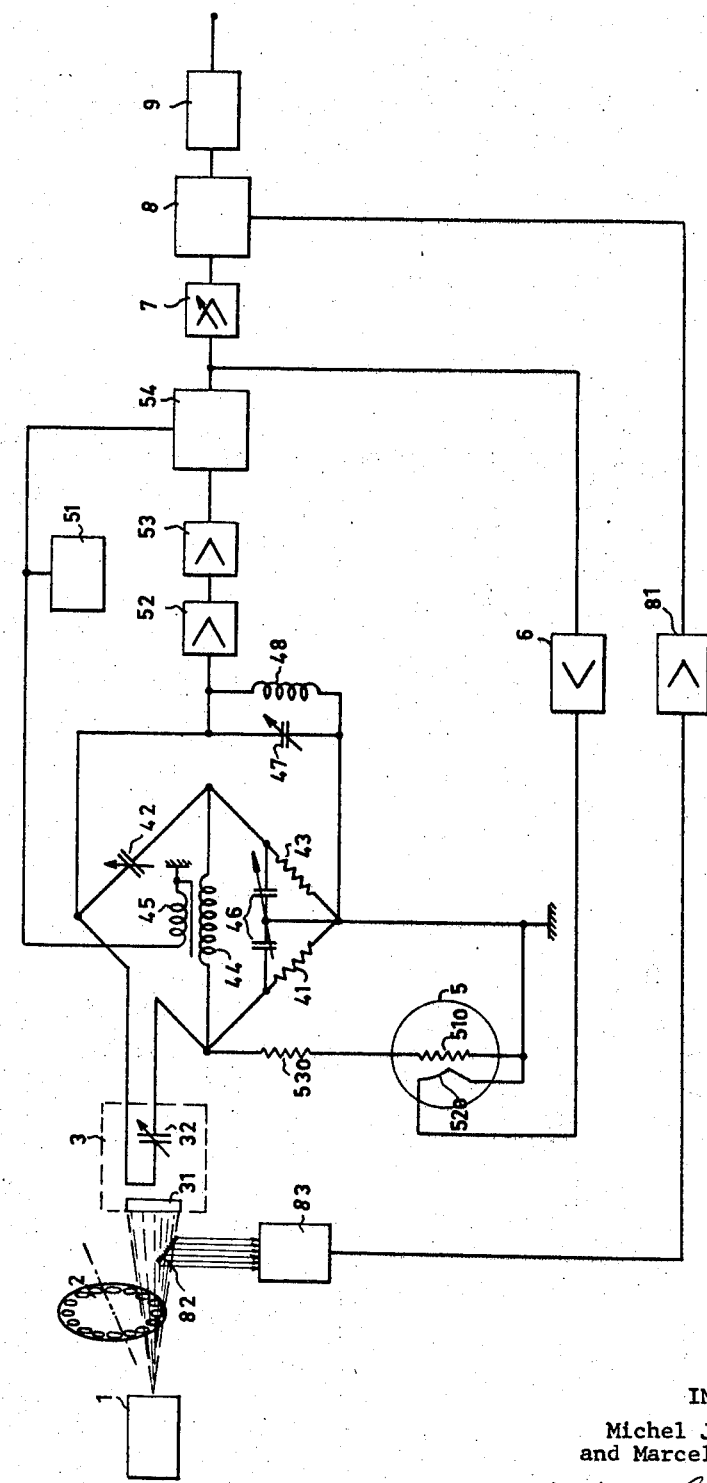

3,426,202
MEASURING SYSTEM FOR PNEUMATIC
INFRARED DETECTOR
Michel J. L. Gay, Villeneuve-Saint-Georges, and Marcel Penaud, Nanterre, France, assignors to Office National d'Etudes et de Recherches Aerospatiales, a body corporate of France
Filed May 25, 1967, Ser. No. 641,227
Claims priority, application France, May 31, 1966, 63,580
U.S. Cl. 250—83.3                     2 Claims
Int. Cl. G01t 1/16

ABSTRACT OF THE DISCLOSURE

A measuring system for a pneumatic infra-red detector comprising a variable capacitor whose capacitance depends on the infra-red energy applied, in which said infra-red energy is modulated at a low frequency, said capacitor is included in one arm of a high-frequency tuned Schering bridge modulating at said low frequency the high-frequency output signal of said bridge and an indirect-heating thermistor connected in parallel to a resistive arm of said bridge is heated by the continuous component of said output signal for controlling said bridge at zero.

---

The invention relates to the measurement of very low infra-red energies detected by means of a pneumatic detector.

It is known that pneumatic receivers have a sensitivity threshhold and a time constant that are comparable to those of other heat detectors such as bolometers and thermopiles. It is also known that they have the advantage over the latter of a larger area for receiving incident radiation, so that they enable lower illuminations to be measured for the same energy flux received. In addition, their energy sensitivity depends very little on the wavelength of the incident radiation.

The object of the invention is to provide a measuring system adapted to heat detectors of the pneumatic-receiver type.

A pneumatic receiver behaves from an electrical point of view like a capacitor whose capacitance varies according to the incident energy and comprises generally a receiving diaphragm in the middle of a gaseous space bounded on one side by a window that is transparent in the range of the radiations used and on the other side by a metallized flexible diaphragm, termed the measuring diaphragm, disposed near a fixed electrode so as to form a variable capacitor. The heating of the receiving diaphragm caused by the absorption of the incident radiation is communicated to the gas surrounding it and causes an increase in pressure, so that the measuring diaphragm is deformed, approaches the fixed armature and thus causes the capacitance of the capacitor to be varied. The capacitor is in a capacitance bridge fed with a high-frequency voltage. As a receiver of this kind is insensitive to the continuous component of the energy it receives, the radiation to be studied is modulated to a low frequency, thus modulating the unbalance level of the bridge, so that, after high-frequency preamplification and a first synchronous detection followed by low-frequency amplification, an alternating signal is produced, or, by a second detection, a continuous signal whose value represents the measurement carried out.

A disadvantage of the prior-art electronic system described above is that its contribution to the noise factor of the output signal is appreciable.

A specific object of the invention is to reduce the contribution to noise by an electronic system of this kind.

The performances of measuring systems of known type are limited, firstly, when the output signal of the pneumatic receiver is frequency-modulated or phase-modulated, by the frequency fluctuations of the oscillator, and, secondly, in the case of amplitude modulation, by the thermal noise of the modulator and preamplifier.

A characteristic of the measuring system according to the invention is that it has a modulator and preamplifier with only slight thermal noise.

A characteristic of the modulator of the measuring system according to the invention is that it is a tuned-bridge amplitude modulator.

Another disadvantage of prior-art measuring systems is that the adjustments of their circuits are modified by instabilities in the capacitance of the pneumatic receiver at very low frequencies and necessitate frequent readjustments.

Another object of the invention is to make it no longer necessary to carry out these adjustments during measurement.

A characteristic of the measuring system according to the invention is that it includes means for controlling the measuring bridge at zero.

Another characteristic of the measuring system according to the invention is that it includes a thermal-shunt-compensation circuit, which forms a servo loop.

The invention will be more clearly understood from the following description taken in relation with the accompanying drawing wherein the single figure is a partly detaile general diagram of the measuring system according to the invention.

The measuring system shown in the drawing includes a radiation source 1, at least part of the spectrum of which is within the infra-red range, and a radiation modulator 2 having a low freqnecy $f_1$. The modulator 2 is, for example, a disc having holes distributed at equal intervals near its periphery and rotated about its axis by an electric motor (not shown). The modulator 2 is disposed between the radiation source 1 and a window 31, made for example of rock salt, which is formed in one of the walls of a pneumatic receiver 3 of known type and through which the infra-red radiation to be studied can pass. The receiver 3 is electrically equivalent to a variable capacitor 32, whose capacitance depends on the radiation passing through the window 31.

The variable capacitor 32 is connected between an input terminal and an output terminal of a bridge with capacitors and resistors of known type, termed a Schering bridge and described, for example, in the publication, "Reference Data for Radio Engineers," published in New York by "International Telephone and Telegraph Corporation," 4th edition, 1957, page 266. The capacitor 32, which thus forms a first arm of the Schering bridge, is connected, firstly, by the input terminal to a resistor 41, which forms its second arm and has its other end earthed, and, secondly, by the output terminal to a variable capacitor 42, which forms its third arm. The fourth arm of the bridge, connecting the earthed end of the resistor 41 to the capacitor 42, is formed by a resistor 43. The diagonal of the bridge, which connects the point common to the capacitor 32 and the resistor 41 to the point common to the capacitor 42 and the resistor 43, is formed by an inductor 44 shunted by a pair of variable capacitors 46, whose common point is earthed. The inductor 44 forms the secondary of a transformer, whose primary 45 is connected, firstly to the earth and secondly to the output of an oscillator 51 having a relatively high frequency $f_2$, for example about 455 kilocycles/second. The output terminal common to the capacitors 32 and 42 is connected, firstly, to the input of a preamplifier 52, and, secondly, to the earth through a circuit comprising in parallel a variable capacitor 47 and an inductor 48. The resistors 41 and 43 are two stable resistors having the same relatively low value, for example about $100\Omega \pm 1\%$. The variable capacitor 42 is used to balance the bridge. The latter is tuned to the frequency $f_2$ of the oscillator 51 by means of the inductor 44, and the variable capacitor 47 is used for the fine adjustment of this tuning, particularly when the receiver 3 is changed. With a value of the inductor 44 of 1.35 millihenry, with the resistances indicated above by way of example and adjustment of the capacitors 42 and 47 corresponding, firstly, to the balancing of the bridge and, secondly, to its tuning to the frequecy $f_2 = 455$ kc./s., the Q of the equivalent resonant circuit is 33.

The preamplifier 52 has a high input impedance and produces little noise. It may be produced, for example, by using a field-effect transistor, and its gain may be about 6.

The output of the preamplifier 52 is connected to the input of a conventional amplifier 53, which may have a gain of about 10 at the frequency $f_2$. The output of the high-frequency amplifier 53 is connected to the input of a synchronous demodulator 54 of known type, to which the output signal, at the high-frequency $f_2$, of the oscillator 51 is fed. The output signal of the demodulator 54, which is a low-frequency signal having the frequency $f_1$, is fed, firstly, to the input of a low-frequency amplifier 7 having an adjustable gain, and, secondly, through a direct-current amplifier 6, to the control input of an indirect-heating thermistor 5, i.e. to the heating filament 520 of a resistor 510 having a negative temperature coefficient. The latter is connected in series with a resistor 530 between earth and the input terminal of the Schering bridge to which the capacitor 32 and resistor 41 are connected.

The circuit formed by the amplifier 6, the thermistor 5 and the resistor 530 is for the automatic adjustment of the balancing of the measuring bridge. As the receiver 3 is not sensitive to the continuous component of the radiation from the source 1, the continuous component of the signal having a frequency $f_1$ delivered by the demodulator 54 is proportional to the thermal drifts of the part of the measuring system between the output of the receiver 3 and the output of the demodulator 54. The thermistor 5 and resistor 530 in series being connected in parallel to the arm of the measuring bridge formed by the resistor 41, the thermistor 5 introduces into the bridge an unbalance which compensates for the accumulated thermal drifts appearing at the output of the demodulator 54, and the function of the resistor 530 is to limit the heating of the thermistor 5 by currents due to the high-frequency voltage at the terminals of the resistor 41. The high time constant of the thermistor 5 causes the alternating component having the frequency $f_1$ of the output signal of the demodulator 54, i.e. the useful signal, to have no effect on its resistance.

The output of the low-frequency amplifier 7 having an adjustable gain is connected to the input of a synchronous demodulator 8, which is controlled by a reference signal coming from the mechanical modulator 2 and shaped by an amplifier 81. This reference signal may, for example, be picked up by a small mirror 82 interposed at the edge of the infra-red beam between the modulator 2 and the receiver 3, and converted into an electric signal by a photoelectric cell 83.

The output of the synchronous demodulator 8 is connected to the input of a band filter 9, which eliminates the residue of the carrying frequency $f_2$ and fixes the pass band at the desired value. There thus appears at its output an alternating signal whose effective value can be measured, or else, after a second detection, a continuous voltage, which can be measured and recorded.

The results obtained confirm that the measuring system described above has a noise coefficient that is ten times as low as that of prior-art measuring systems.

We claim:
1. A measuring system for very low infra-red energies comprising an infra-red radiation source, a pneumatic infra-red detector having an infra-red radiations permeable window and a variable capacitor whose capacitance depends on the infra-red energy passing through said window, a low frequency modulator disposed between said source and said window, a relatively high frequency oscillator, a tuned Schering bridge coupled to said oscillator, said variable capacitor being included in a capacitive arm of said bridge so that the output signal of said bridge is amplitude modulated at the frequency of said modulator, and means for controlling said bridge at zero by the continuous component of said output signal.

2. A measuring system for very low infra-red energies comprising an infra-red radiation source, a pneumatic infra-red detector having an infra-red radiations permeable window and a variable capacitor whose capacitance depends on the infra-red energy passing through said window, a low frequency modulator disposed between said source and said window, an oscillator providing a relatively high frequency carrier signal, a tuned Schering bridge having a first and a second input terminals, means for applying said carrier signal between said input terminals, a first and a second output terminals, amplificator means and demodulator means connected in series to said output terminals, a first and a second capacitive arms between said input terminals and said first output terminals, said variable capacitor being included in said first capacitive arm, a first and a second resistive arms between said input terminals and said second output terminals, a temperature compensation thermistor connected in parallel with said first resistive arm and means for controlling the heating of said thermistor by the continuous component of the output signal of said demodulator means.

References Cited

UNITED STATES PATENTS

| | | | |
|---|---|---|---|
| 3,198,946 | 8/1965 | Atwood | 250—83.3 |
| 3,215,832 | 11/1965 | Madsen et al. | 250—83.3 |
| 3,384,749 | 5/1968 | Golay | 250—83 |

RALPH G. NILSON, *Primary Examiner.*

A. B. CROFT, *Assistant Examiner.*

U.S. Cl. X.R.

250—43.5